(12) United States Patent
Nagai

(10) Patent No.: US 7,565,571 B2
(45) Date of Patent: Jul. 21, 2009

(54) DATA PROCESSING METHOD, DATA PROCESSING APPARATUS, AND PROGRAM

(75) Inventor: Hiroyuki Nagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 11/502,561

(22) Filed: Aug. 11, 2006

(65) Prior Publication Data

US 2007/0061112 A1 Mar. 15, 2007

(30) Foreign Application Priority Data

Aug. 24, 2005 (JP) .............................. 2005-242316

(51) Int. Cl.
*G06F 11/00* (2006.01)
(52) U.S. Cl. ....................................................... 714/6
(58) Field of Classification Search ................. 714/2–6, 714/8, 15, 16, 18, 20, 26, 37, 39, 54, 57
See application file for complete search history.

(56) References Cited

U.S. PATENT DOCUMENTS

| | | | | |
|---|---|---|---|---|
| 5,371,745 A | * | 12/1994 | Kiyonaga et al. | 714/758 |
| 5,533,031 A | * | 7/1996 | Dounn et al. | 714/718 |
| 6,543,010 B1 | * | 4/2003 | Gaudet et al. | 714/45 |
| 6,738,752 B2 | | 5/2004 | Sako et al. | |
| 6,993,679 B2 | * | 1/2006 | George | 714/8 |
| 7,281,160 B2 | * | 10/2007 | Stewart | 714/8 |
| 7,366,963 B2 | * | 4/2008 | Yoshida | 714/705 |
| 2003/0163756 A1 | * | 8/2003 | George | 714/5 |
| 2006/0075291 A1 | * | 4/2006 | Takahashi | 714/6 |

FOREIGN PATENT DOCUMENTS

| | | |
|---|---|---|
| JP | 6-231570 | 8/1994 |
| JP | 10243372 A | 9/1998 |
| JP | 2000-101573 A | 4/2000 |
| JP | 2005-011092 A | 1/2005 |
| JP | 2005020437 A | 1/2005 |
| JP | 2005065232 A | 3/2005 |

* cited by examiner

*Primary Examiner*—Nadeem Iqbal
(74) *Attorney, Agent, or Firm*—Fitzpatrick, Cella, Harper & Scinto

(57) ABSTRACT

A data reproducing apparatus detects an unreadable portion of content data and requests, via a network, compensation data for compensating for the unreadable portion from a compensation-data supplying apparatus. The data reproducing apparatus reproduces content by switching between a readable portion of the content data and the compensation data supplied from the server. The reproduction of content including a portion that cannot be read or easily read is thus achieved.

29 Claims, 6 Drawing Sheets

DATA PROCESSING METHOD, DATA PROCESSING APPARATUS, AND PROGRAM

BACKGROUND OF THE INVENTION

1. Field of the Invention

The present invention relates to data reproduction.

2. Description of the Related Art

Content is stored on a variety of media and is transferred or sold. Content is a set of data recorded on a medium, such as a compact disk read only memory (CD-ROM) or a digital versatile disk read only memory (DVD-ROM), transmitted, and enjoyed by humans. Examples of content include applications used on personal computers (PCs), music, and video. Media are designed to have correction capabilities so that they are readable even if having been damaged to some extent. However, if such media are damaged to an extent exceeding the permissible level, the damaged portion cannot be read or cannot operate properly. For example, if a CD-ROM or DVD-ROM is accidentally scratched during insertion into or removal from a player or media storage case, the scratched portion may not be read or easily read.

As a solution, Japanese Patent Laid-Open No. 06-231570 describes a method in which a particular data area including a portion corresponding to a damaged portion of a medium is stored as an irreproducible data area so as not to be played back consistently. For example, in a music CD, a defective track is stored as an irreproducible track so as to prevent sound skipping during reproduction of the track.

However, with the known method described above, it is still difficult to reproduce part of content. If an error that is beyond correction capabilities occurs, the reproduction of content intended by the content provider cannot be carried out.

SUMMARY OF THE INVENTION

The present invention is directed to a data processing method, data processing apparatus, and program for processing data including a portion that cannot be read or cannot be easily read.

According to an aspect of the present invention, a data processing method includes the steps of detecting a read error portion of reproduction target data stored on a storage medium, the read error portion having been unable to be read from the storage medium; requesting, via a network, compensation data for compensating for the read error portion from a compensation-data supplying apparatus; obtaining the compensation data supplied from the compensation-data supplying apparatus; and reproducing the reproduction target data by replacing the read error portion with the compensation data.

According to another aspect of the present invention, a data processing apparatus includes a detecting unit configured to detect a read error portion of reproduction target data stored on a storage medium, the read error portion having been unable to be read from the storage medium; a requesting unit configured to request, via a network, compensation data for compensating for the read error portion from a compensation-data supplying apparatus; an obtaining unit configured to obtain the compensation data supplied from the compensation-data supplying apparatus; and a reproducing unit configured to reproduce the reproduction target data by replacing the read error portion with the compensation data.

According to another aspect of the present invention, a program includes the steps of detecting a read error portion of reproduction target data stored on a storage medium, the read error portion having been unable to be read from the storage medium; requesting, via a network, compensation data for compensating for the read error portion from a compensation-data supplying apparatus; obtaining the compensation data supplied from the compensation-data supplying apparatus; and reproducing the reproduction target data by replacing the read error portion with the compensation data.

Other features besides those discussed above shall be apparent to those skilled in the art from the description of exemplary embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

Exemplary embodiments of the present invention will now be described in detail with reference to the attached drawings.

First Exemplary Embodiment

Figure 1:
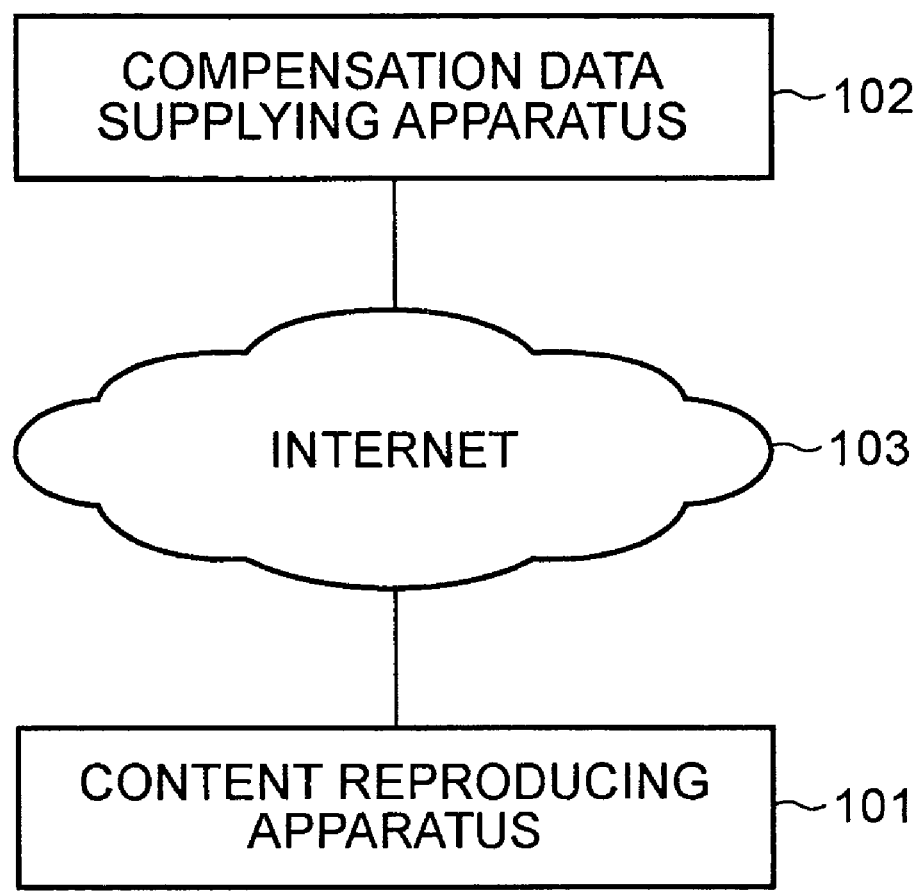
FIG. 1 illustrates an exemplary configuration of components of a system.

FIG. 1 illustrates an exemplary configuration of components of a system according to the present exemplary embodiment. A content reproducing apparatus 101 is typically used for playback of content by users who have purchased the content. Content is a set of data recorded on media, transmitted, and enjoyed by humans. Examples of content include video, images, music, and text. The playback of content involves reproduction of data. A compensation-data supplying apparatus 102 is typically used by companies who have sold or transferred content. The content reproducing apparatus 101 and the compensation-data supplying apparatus 102 can be connected to a network via the Internet 103 or the like.

Figure 2:
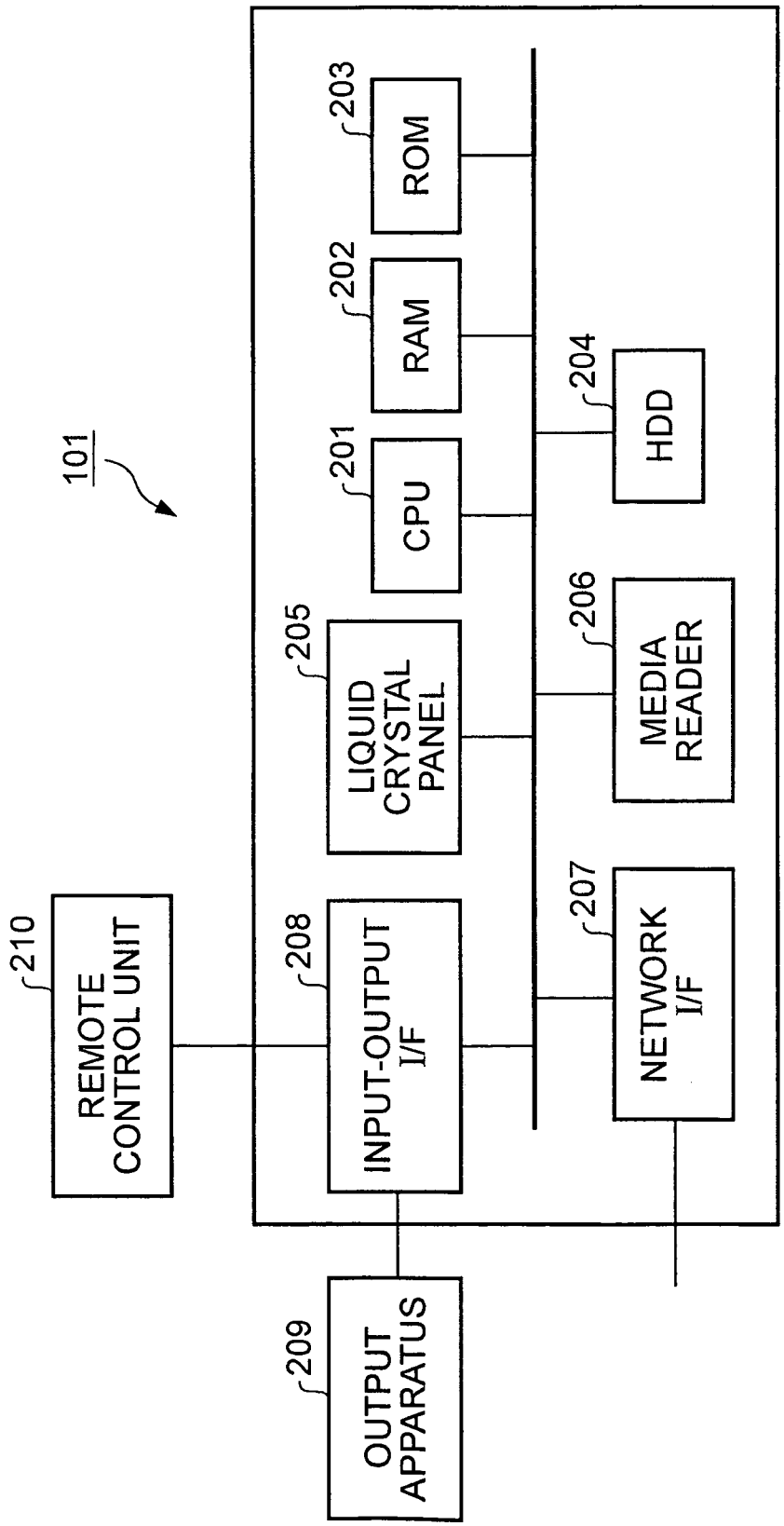
FIG. 2 illustrates an exemplary internal configuration of a content reproducing apparatus.

FIG. 2 illustrates an exemplary internal configuration of the content reproducing apparatus 101. A central processing unit (CPU) 201 controls the content reproducing apparatus 101. A random access memory (RAM) 202 temporarily stores a program to be executed according to the present invention, and data generated during the execution. A read only memory (ROM) 203 stores a program defining the operation of the content reproducing apparatus 101. A hard disk drive (HDD) 204 stores compensation data.

A liquid crystal panel 205 informs the user of the operating status of the content reproducing apparatus 101. A media reader 206 reads a medium to reproduce data stored thereon.

A network interface 207 provides a connection via the Internet 103 to the compensation-data supplying apparatus 102. The content reproducing apparatus 101 transmits a request for compensation data through the network interface 207 to the compensation-data supplying apparatus 102, and receives the requested compensation data from the compensation-data supplying apparatus 102 through the network interface 207. An input-output interface 208 provides a connection to external apparatuses. An output apparatus 209 outputs reproduced content, such as sound, still images, moving images, and text. A remote control unit 210 is used by the user to control the content reproducing apparatus 101.

Figure 3:
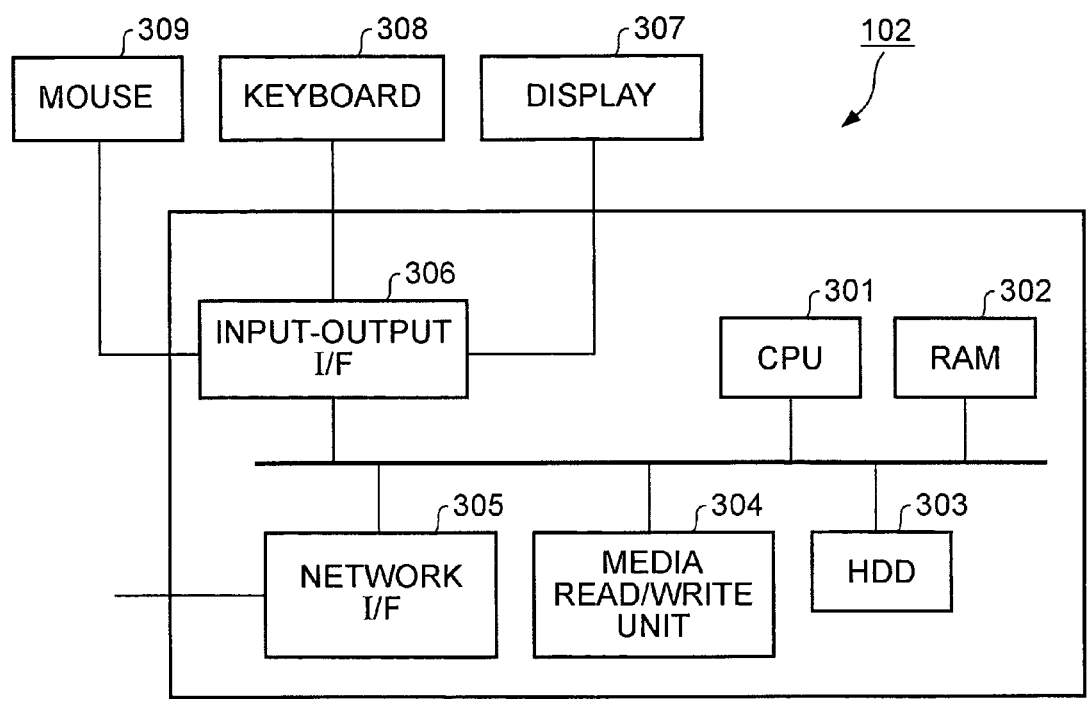
FIG. 3 illustrates an exemplary internal configuration of a compensation-data supplying apparatus.

FIG. 3 illustrates an exemplary internal configuration of the compensation-data supplying apparatus 102. A CPU 301 controls the compensation-data supplying apparatus 102. A RAM 302 temporarily stores a program to be executed and data generated during the execution. A HDD 303 stores content data. A media read/write unit 304 reads and writes data from and to a medium. A network interface 305 provides a connection via the Internet 103 to the content reproducing apparatus 101. An input/output interface 306 provides a connection to external apparatuses. A display 307 informs the operator of the operating status of the compensation-data supplying apparatus 102. A keyboard 308 and a mouse 309 are used by the operator to input information.

The functions of each of the content reproducing apparatus 101 and the compensation-data supplying apparatus 102 may either be implemented by a single apparatus or by a plurality of apparatuses among which the functions are distributed, the plurality of apparatuses being interconnected via a local area network (LAN) or the like that allow them to communicate with each other.

Figure 4:
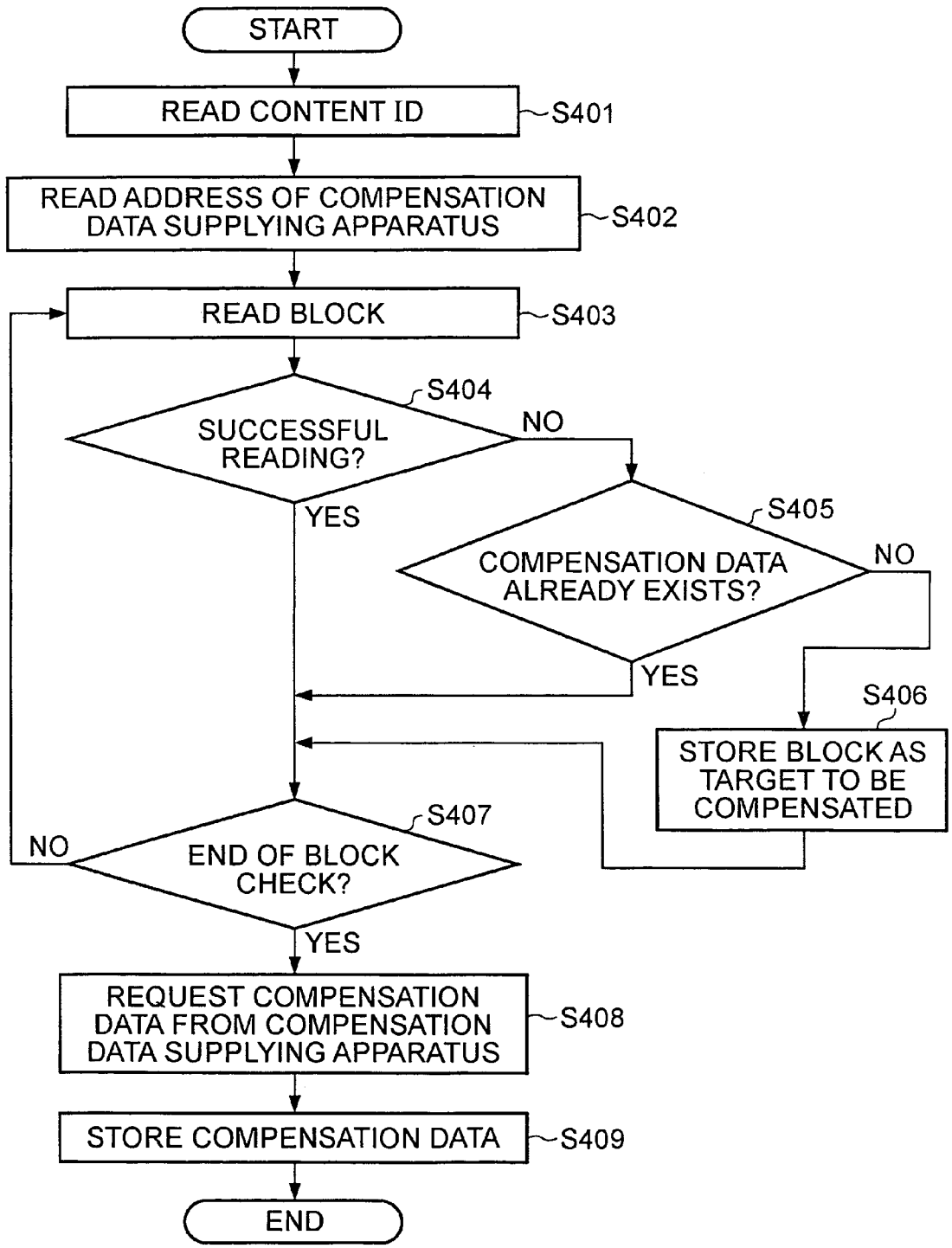
FIG. 4 is a flowchart illustrating an exemplary procedure performed by the content reproducing apparatus for reading media data, obtaining compensation data, and storing the received compensation data.

FIG. 4 is a flowchart illustrating an exemplary procedure performed by the content reproducing apparatus 101 for reading media data, requesting the transmission of compensation data, and storing the received compensation data. This procedure may be performed through a series of processing steps. A program for implementing the flowchart in FIG. 4 is stored in the ROM 203 and executed by the CPU 201. The reading of media data is executed when a medium is inserted into the media reader 206 and the user requests, either directly or with the aid of the remote control unit 210, the content reproducing apparatus 101 to perform processing for media restoration.

Upon start, the content reproducing apparatus 101 reads a content ID described in the medium (step S401). The content ID is a character string for identifying content or media. Next, in a similar manner, the content reproducing apparatus 101 reads the address of the compensation-data supplying apparatus 102 from the medium (step S402). The address of the compensation-data supplying apparatus 102 is used by the content reproducing apparatus 101 to communicate with the compensation-data supplying apparatus 102 via the Internet 103. The content ID and the address of the compensation-data supplying apparatus 102, which are written in predetermined locations in the medium, are read out and stored, for example, in the RAM 202 of the content reproducing apparatus 101.

Next, the content reproducing apparatus 101 reads content data on a block-by-block basis (step S403). Here, a block is a unit determined by the format of the medium or content. A read error can be detected on a block-by-block basis. An error portion of the content data is compensated on a block-by-block basis. For example, content data in a music CD is written on a frame-by-frame basis, sector-by-sector basis, track-by-track basis, or the like. Each track consists of a plurality of sectors, each sector consisting of a plurality of frames. A frame includes error correction code and is a unit in which an error can be detected. Therefore, in a music CD, a frame, a sector, or a track can act as a block as described above. In the present invention, an error refers to an error that is beyond the correction capabilities of a reproducing apparatus or a medium.

After reading a block of content data, the content reproducing apparatus 101 determines whether the reading has been successful (step S404). If not, it is further determined whether compensation data for the block is stored in the content reproducing apparatus 101 (step S405). If the reading has failed and no compensation data exists, the content reproducing apparatus 101 stores, in the HDD 204, the block as a target to be compensated by compensation data (step S406). This series of processing steps are performed on every block (step S407). Upon completion of the checking of all the blocks, the content reproducing apparatus 101 requests the compensation-data supplying apparatus 102 to transmit compensation data for the target data stored in step S406 (step S408). Then, the content reproducing apparatus 101 stores, in the HDD 204, the compensation data received from the compensation-data supplying apparatus 102 (step S409). By storing the compensation data in the HDD 204, the content reproducing apparatus 101 can be prevented from requesting the same data in the next playback of the medium, as the content reproducing apparatus 101 can recognize in step S405 that the compensation data has already been stored.

Figure 5:
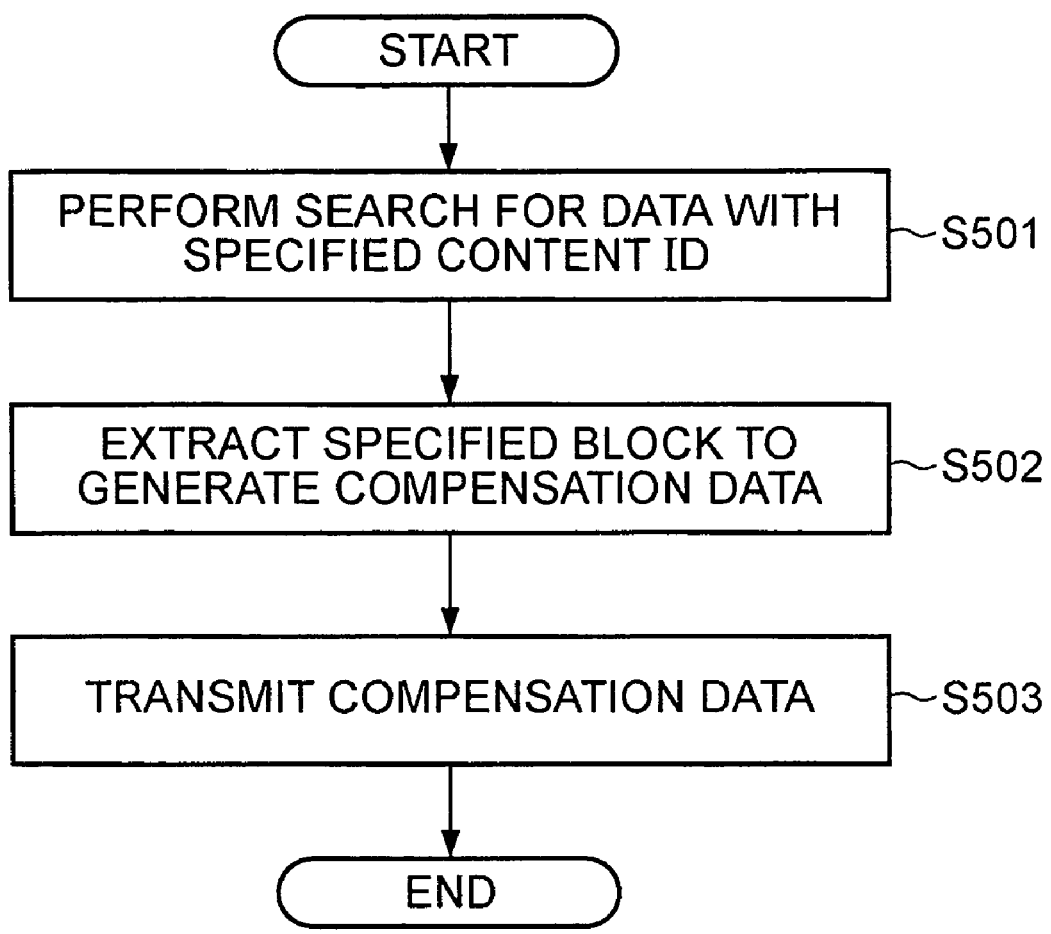
FIG. 5 is a flowchart illustrating an exemplary procedure performed by the compensation-data supplying apparatus for transmitting compensation data.

FIG. 5 is a flowchart illustrating an exemplary procedure performed by the compensation-data supplying apparatus 102 for transmitting compensation data. A program for implementing the flowchart is stored in the HDD 303 and executed by the CPU 301. The step of transmitting compensation data is performed in response to a request from the content reproducing apparatus 101 in step S408 of FIG. 4. The request is received via a network. First, the compensation-data supplying apparatus 102 uses a content ID to search content data, which is stored in the HDD 303, for data corresponding to the requested compensation data (step S501). Next, the compensation-data supplying apparatus 102 extracts a requested block from the retrieved data to generate compensation data (step S502). Then, the compensation-data supplying apparatus 102 transmits the generated compensation data to the content reproducing apparatus 101 (step S503).

Figure 6:
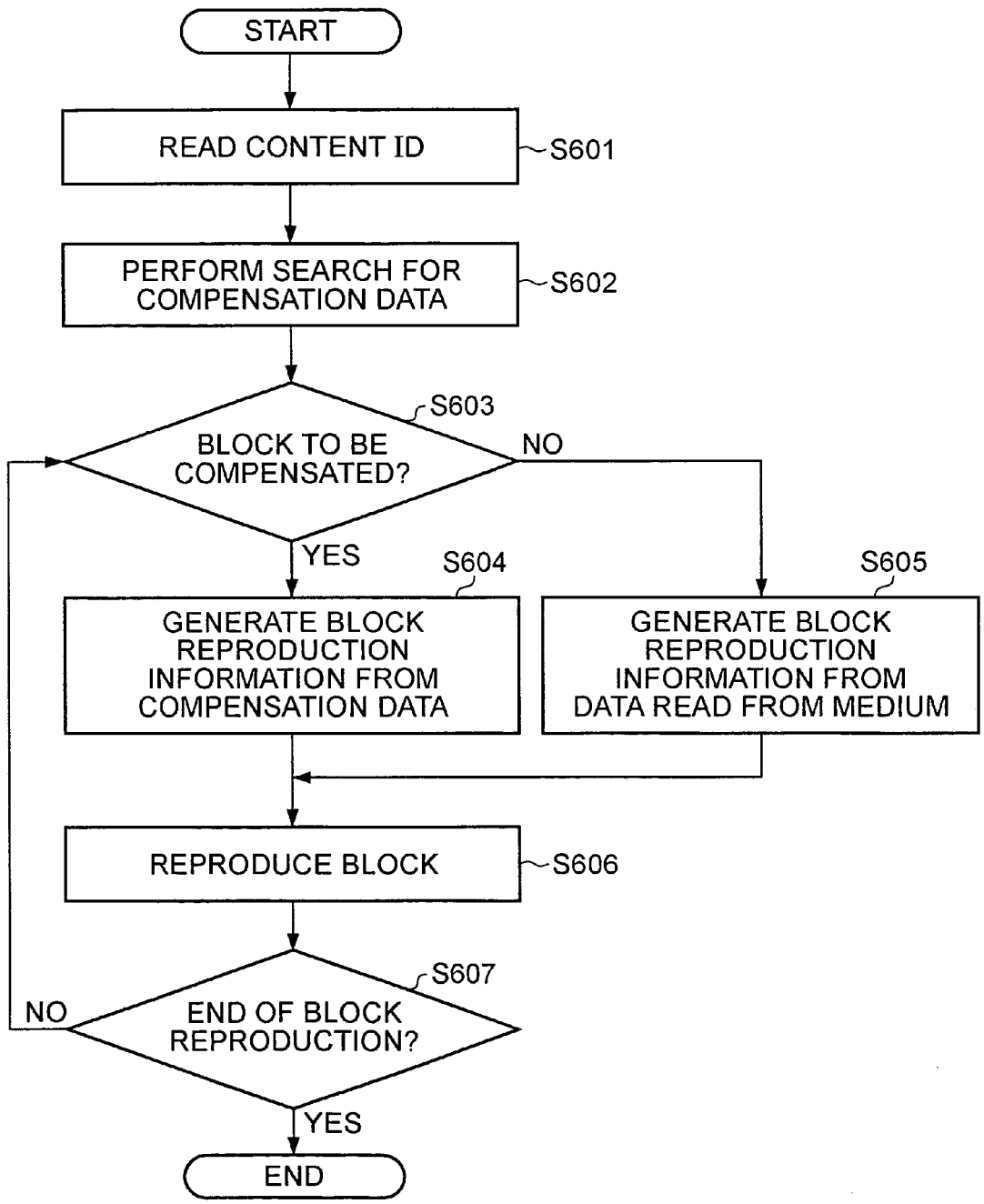
FIG. 6 is a flowchart illustrating an exemplary procedure performed by the content reproducing apparatus for reproducing content.

FIG. 6 is a flowchart illustrating an exemplary procedure performed by the content reproducing apparatus 101 for reproducing content. A program for implementing the flowchart is stored in the ROM 203 and executed by the CPU 201. The content reproduction is executed when a medium is inserted into the media reader 206 and the user requests, either directly or with the aid of the remote control unit 210, the content reproducing apparatus 101 to perform processing for content reproduction. First, the content reproducing apparatus 101 reads, from the medium, the content ID of the requested content (step S601). Next, the content reproducing apparatus 101 uses the content ID obtained in step S601 to search data stored in the HDD 204 for compensation data corresponding to the content (step S602). In step S502 of FIG. 5, compensation data for a requested block is generated. If a plurality of blocks have been requested, compensation data is generated such that each block is identifiable.

Next, the content requested to be reproduced is processed on a block-by-block basis. The content reproducing apparatus 101 determines whether the block to be reproduced is a target to be compensated (step S603). If the compensation data retrieved in step S602 includes data of the block to be reproduced, the block is a target to be compensated. In this case, reproduction information for the block is generated from the retrieved compensation data (step S604). As described above, if there are a plurality of compensation data blocks, each block is identifiable. If the block to be reproduced is not a target to be compensated, the content reproducing apparatus 101 reads the corresponding block from the medium to generate reproduction information (step S605). Next, the content reproducing apparatus 101 reproduces the reproduction information obtained in step S604 or in step S605 (step S606). The content reproducing apparatus 101 thus reproduces content by switching between a normal block and a compensated block generated from the compensation data read from the HDD 204. The process terminates when all blocks contained in the specified reproduction range have been processed (step S607). It is also possible to create a new medium from composite data composed of compensated blocks and normal blocks.

Second Exemplary Embodiment

In the first exemplary embodiment described above, the address of the compensation-data supplying apparatus 102 on the Internet 103 is read from the medium. In the second exemplary embodiment, a server apparatus is provided, so that the address of the compensation-data supplying apparatus 102 to be referred to can be obtained using a content ID. An exemplary server apparatus is a public server apparatus run by a plurality of companies. This configuration requires the address of the server apparatus. A fixed address assigned to the server apparatus is stored during the production thereof and implemented. In the second exemplary embodiment, the content reproducing apparatus 101 refers to the server apparatus for the address of the compensation-data supplying apparatus 102 in step S402, instead of reading it from the medium. The other operations are the same as those of the first exemplary embodiment.

Third Exemplary Embodiment

In the first exemplary embodiment described above, the user requests the content reproducing apparatus 101 to perform processing for media restoration. In the third exemplary embodiment, media restoration is automatically performed in reproducing content. This can be achieved, for example, if the content reproducing apparatus 101 reads the medium in advance of performing the content reproduction by the amount of time required for the restoration of the medium. It is also possible to set such that the duration of this preceding time is variable.

However, the amount of time required for the restoration of the medium may be longer than expected, as it includes the time for communication via the Internet and the processing time of the compensation-data supplying apparatus 102. If the expected time has been exceeded, the reproduction of content may be delayed. On the other hand, this configuration eliminates the need of storing compensation data in the HDD 204 and allows the content reproducing apparatus 101 to request compensation data from the compensation-data supplying apparatus 102 for every reproduction of content. Since the HDD 204 can be removed, a low-cost content reproducing apparatus 101 can be achieved.

Fourth Exemplary Embodiment

In the first exemplary embodiment described above, the compensation-data supplying apparatus 102 transmits data corresponding to a requested block as compensation data without making any modification. In the fourth exemplary embodiment, the quality of compensation data is set lower than that of the original if the data quality of content can be reduced without changing the contents thereof, such as in the case of video or music. For example, in a music CD, compensation data is converted into MPEG Audio Layer-3 (MP3) data or monophonic data. In this case, in step S502, the compensation-data supplying apparatus 102 generates compensation data in a format different from that of the original. It is only necessary that reproduction information be generated in step S604 to accommodate the format of the compensation data to be supplied. A reduction in the data quality of the content serves as a countermeasure to an unauthorized request for compensation data, as perfect compensation data is not supplied. Moreover, since the size of compensation data can be reduced, a load placed on the compensation-data supplying apparatus 102 or network can be reduced.

However, a problem here is that the reproduction quality of the compensated part of the content is degraded. A possible solution to this problem is to allow the quality of compensation data to be variable. Specifically, a company that runs the compensation-data supplying apparatus 102 can provide a service in which the quality of compensation data can be changed according to the amount paid by the user for the compensation service. For example, compensation data is not supplied to users who have paid for content only. It is also possible to set different rates for compensation for lower quality data and compensation for data of the same quality as that of the data when purchased. Billing information may be, for example, written in a medium or identified by specifying a content ID.

It is also possible to change the quality of compensation data depending on whether damage to the data is caused by an initial failure or user error. For example, compensation data of the same quality as that of content data when purchased is supplied if the content data has become unreadable within a week of purchase, and thereafter, the quality of the compensation data is degraded. This method can be used in combination with the above-described billing information to change the quality of the compensation data.

Fifth Exemplary Embodiment

Although the compensation-data supplying apparatus 102 fully responds to requests from the content reproducing apparatus 101 in the first exemplary embodiment described above, a certain limit is placed in the fifth exemplary embodiment. For example, an upper limit is placed on the amount of compensation data to be transmitted in response to a request from the content reproducing apparatus 101. This limit can be implemented in the following way.

First, the content reproducing apparatus 101 is assigned a unique ID. The content reproducing apparatus 101 transmits the assigned ID when requesting compensation data from the compensation-data supplying apparatus 102. This enables the compensation-data supplying apparatus 102 to identify the content reproducing apparatus 101. The compensation-data supplying apparatus 102 manages request history records, which describe the history of received requests for compensation data. In a process between step S501 and step S502 of FIG. 5, the compensation-data supplying apparatus 102 searches for a request history record corresponding to the received ID. If the retrieved history record indicates that a limit value is reached, the compensation-data supplying apparatus 102 does not generate the requested compensation data and informs the content reproducing apparatus 101 of an error due to the limit. Besides limiting the amount of transmission of compensation data according to the request history record for the content reproducing apparatus 101, the amount of transmission of compensation data may be limited according to the request history record managed with respect to each piece of content. A limit value for the compensation data may be determined, for example, on the basis of the proportion of the amount of compensation data to the total amount of content data, or on the basis of the amount paid by the user. Similar limits may also be placed on the amount of data that may be requested by the content reproducing apparatus 101.

Limiting the amount of compensation data not only provides service provider companies with an option of providing different services according to the amount paid by the users, but also serves as a preventive measure against unauthorized use of services. For example, it is possible to prevent users from repeatedly requesting a piece of compensation data and then combining the obtained pieces of compensation data into the complete content data. It is also possible to prevent users who have obtained a content ID and part of content data from requesting compensation data and obtaining the complete content data. Since the content transmission service at least partially involves the use of the Internet, adequate preventive measures against unauthorized use of the service must be taken. Placing certain limits as described above can be regarded as part of such preventive measures. As another example of preventive measures against unauthorized use, the compensation-data supplying apparatus 102 may perform authentication of the content reproducing apparatus 101 or users. When receiving a request for compensation data, the compensation-data supplying apparatus 102 performs authentication. The compensation-data supplying apparatus 102 accepts requests only from authorized users and authorized content reproducing apparatuses, and thus can prevent unauthorized use of the service. A standard authentication method is applicable here.

Sixth Exemplary Embodiment

The prevention of unauthorized use of compensation data is important for commercial content, and will be further described below. Possible methods for preventing unauthorized use include encryption of compensation data. The compensation-data supplying apparatus 102 encrypts and transmits compensation data to the content reproducing apparatus 101. Upon receipt, the content reproducing apparatus 101 stores the encrypted compensation data and decrypts it for reproduction. It is difficult to decrypt the encrypted compensation data unless the decryption method is made public. Using a content ID as a decryption key makes it more difficult to decrypt the encrypted compensation data. Unauthorized use of compensation data can thus be prevented.

Seventh Exemplary Embodiment

The present invention is applicable not only to CD players, but also to any media players capable of playing media in which read error blocks can be identified. Examples of such media players include audio and video players for playing DVDs, Blu-ray Discs, and silicon media (e.g., compact flash cards and smart media card). The present invention is also applicable to a HDD that includes a non-removable medium and a media reader, and stores content. In this case, the HDD may serve either as media or a media reader.

Eighth Exemplary Embodiment

In the first exemplary embodiment described above, the present invention is implemented by executing a program stored in the ROM 203 of the content reproducing apparatus 101. In the eighth exemplary embodiment, the present invention can be implemented in a general-purpose apparatus capable of reading the same program from a medium. For example, the present invention is implemented by executing application software on a PC. The present invention can also be implemented by executing the program on a hardware circuit without using the CPU.

Although the present invention has been described with reference to the exemplary embodiments, many apparently widely different embodiments of the invention can be made without departing from the spirit and the scope thereof. It is to be understood that the invention is not limited to the specific embodiments thereof except as defined in the appended claims.

This application claims the benefit of Japanese Application No. 2005-242316 filed Aug. 24, 2005, which is hereby incorporated by reference herein in its entirety.

What is claimed is:

1. A data processing method for an apparatus for reproducing reproduction target data, the data processing method comprising the steps of:

detecting a read error portion of the reproduction target data stored on a removable optical disk, the read error portion having been unable to be read from the removable optical disk;

requesting, via a network, compensation data for compensating for the read error portion from a compensation-data supplying apparatus;

obtaining the compensation data supplied from the compensation-data supplying apparatus;

storing the obtained compensation data in a storage unit; and reproducing the reproduction target data by replacing the read error portion with the compensation data stored in the storage unit.

2. The data processing method according to claim 1 wherein, in the detecting step, data read errors are detected in blocks of a predetermined unit based on how the reproduction target data is organized.

3. The data processing method according to claim 1, wherein, in the detecting step, data read errors are detected on a frame-by-frame basis, sector-by-sector basis, or track-by-track basis.

4. The data processing method according to claim 1, wherein a limit is placed on the amount of data that can be requested in the requesting step.

5. The data processing method according to claim 4, wherein the amount of data that can be requested in the requesting step is determined on the basis of the proportion of the requested data to the total amount of the reproduction target data.

6. The data processing method according to claim 4, wherein the amount of data that can be requested in the requesting step is determined on the basis of billing data associated with the reproduction target data stored on the removable optical disk.

7. The data processing method according to claim 1, wherein the reproduction target data is text, a still image, a moving image, voice, or a combination of them.

8. The data processing method according to claim 1, further comprising the step of supplying the requested compensation data to the data reproducing apparatus.

9. The data processing method according to claim 8, wherein a limit is placed on the amount of data that can be supplied in the supplying step.

10. The data processing method according to claim 9, wherein the amount of data that can be supplied in the supplying step is determined on the basis of the proportion of the requested data to the total amount of the reproduction target data.

11. The data processing method according to claim 9, wherein the amount of data that can be supplied in the supplying step is determined on the basis of billing data associated with the reproduction target data stored on the removable optical disk.

12. The data processing method according to claim 8, wherein the compensation data obtained in the supplying step is different in quality from the reproduction target data.

13. The data processing method according to claim 12, wherein the quality of the compensation data is determined on the basis of an amount indicated by billing data included in the reproduction target data stored on the removable optical disk.

14. The data processing method according to claim 1, further comprising a step of reading the address of the compensation-data supplying apparatus from the removable optical disk.

15. The data processing method according to claim 1, further comprising a step of obtaining the address of the compensation-data supplying apparatus by referring to a server apparatus.

16. The data processing method according to claim 1, wherein compensation data for the removable optical disk is obtained prior to a user request to reproduce content from the removable optical disk.

17. The data processing method according to claim 1, wherein the compensation data is encrypted prior to transmission to the content reproducing apparatus.

18. The data processing method according to claim 1, wherein the functions of the content reproducing apparatus are distributed among a plurality of apparatuses.

19. The data processing method according to claim 1, wherein the functions of the compensation-data supplying apparatus are distributed among a plurality of apparatuses.

20. A data processing apparatus for reproducing reproduction target data, comprising:
   a detecting unit configured to detect a read error portion of the reproduction target data stored on a removable optical disk, the read error portion having been unable to be read from the removable optical disk;
   a requesting unit configured to request, via a network, compensation data for compensating for the read error portion from a compensation-data supplying apparatus;
   an obtaining unit configured to obtain the compensation data supplied from the compensation-data supplying apparatus;
   a storage unit configured to store the obtained compensation data; and
   a reproducing unit configured to reproduce the reproduction target data by replacing the read error portion with the compensation data stored in the storage unit.

21. A data processing apparatus for supplying compensation data, comprising:
   a supplying unit configured to supply requested compensation data to the data processing apparatus of claim 20.

22. A data processing system comprising:
   the data processing apparatus for reproducing reproduction target data of claim 20; and
   a data processing apparatus for supplying compensation data, comprising a supplying unit configured to supply requested compensation data to the data processing apparatus for reproducing reproduction target data.

23. A computer-readable medium storing a computer-executable program to be executed by a data reproducing apparatus for reproducing reproduction target data, the program comprising code for:
   detecting a read error portion of the reproduction target data stored on a removable optical disk, the read error portion having been unable to be read from the removable optical disk;
   requesting, via a network, compensation data for compensating for the read error portion from a compensation-data supplying apparatus;
   obtaining the compensation data supplied from the compensation-data supplying apparatus;
   storing the obtained compensation data in a storage unit; and
   reproducing the reproduction target data by replacing the read error portion with the stored compensation data.

24. The method according to claim 1, wherein the removable optical disk is read-only.

25. The method according to claim 1, wherein the storage unit is local to the apparatus for reproducing reproduction target data.

26. The apparatus according to claim 20, wherein the removable optical disk is read-only.

27. The apparatus according to claim 20, wherein the storage unit is local to the apparatus for reproducing reproduction target data.

28. The computer-readable medium according to claim 23, wherein the removable optical disk is read-only.

29. The computer-readable medium according to claim 23, wherein the storage unit is local to the data reproducing apparatus.

* * * * *